Feb. 13, 1951     L. R. PHILLIPS     2,541,280
AIR MIXING AND DELIVERY DEVICE
Filed June 27, 1947     3 Sheets—Sheet 1
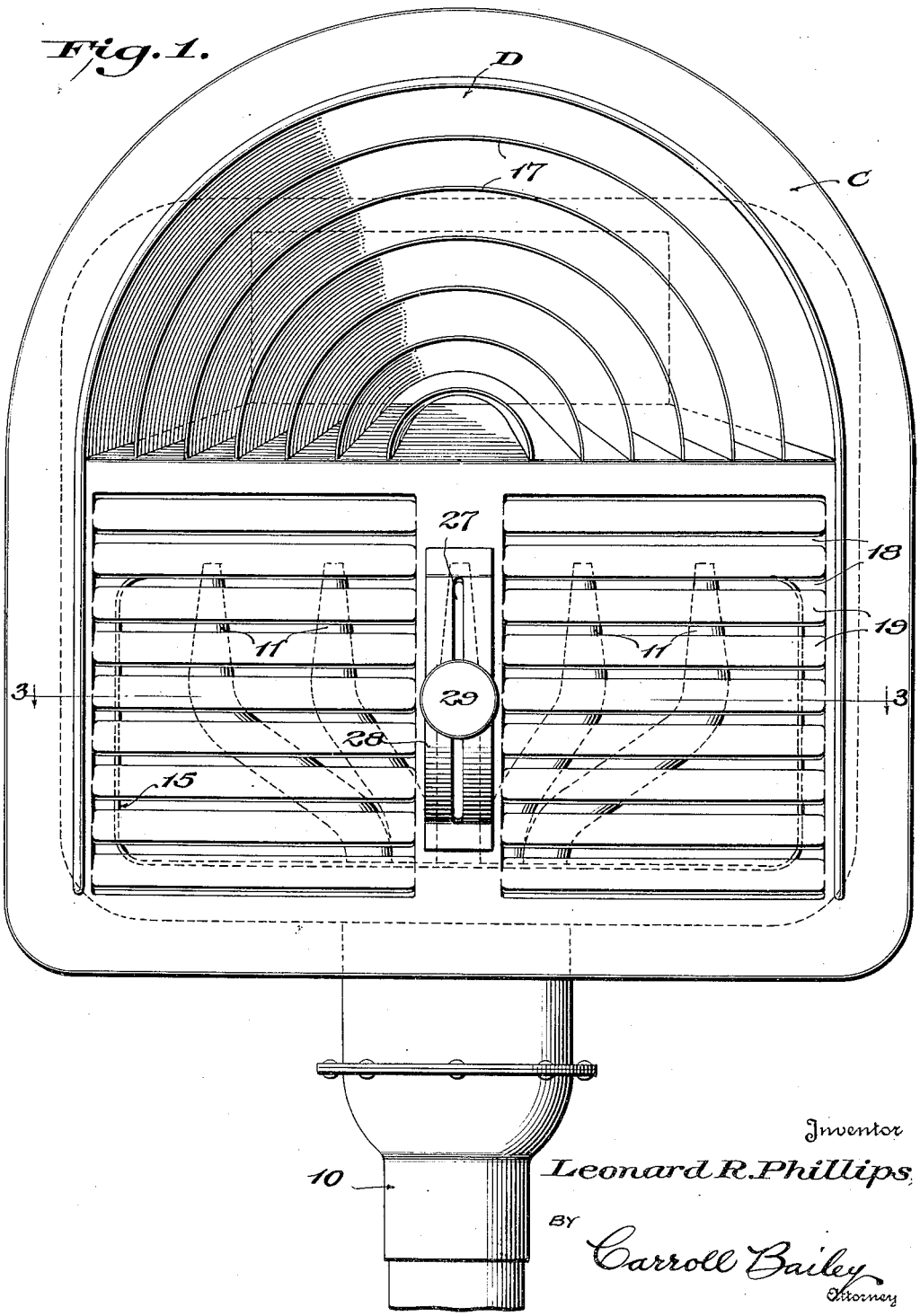
Inventor
Leonard R. Phillips,
By Carroll Bailey
Attorney

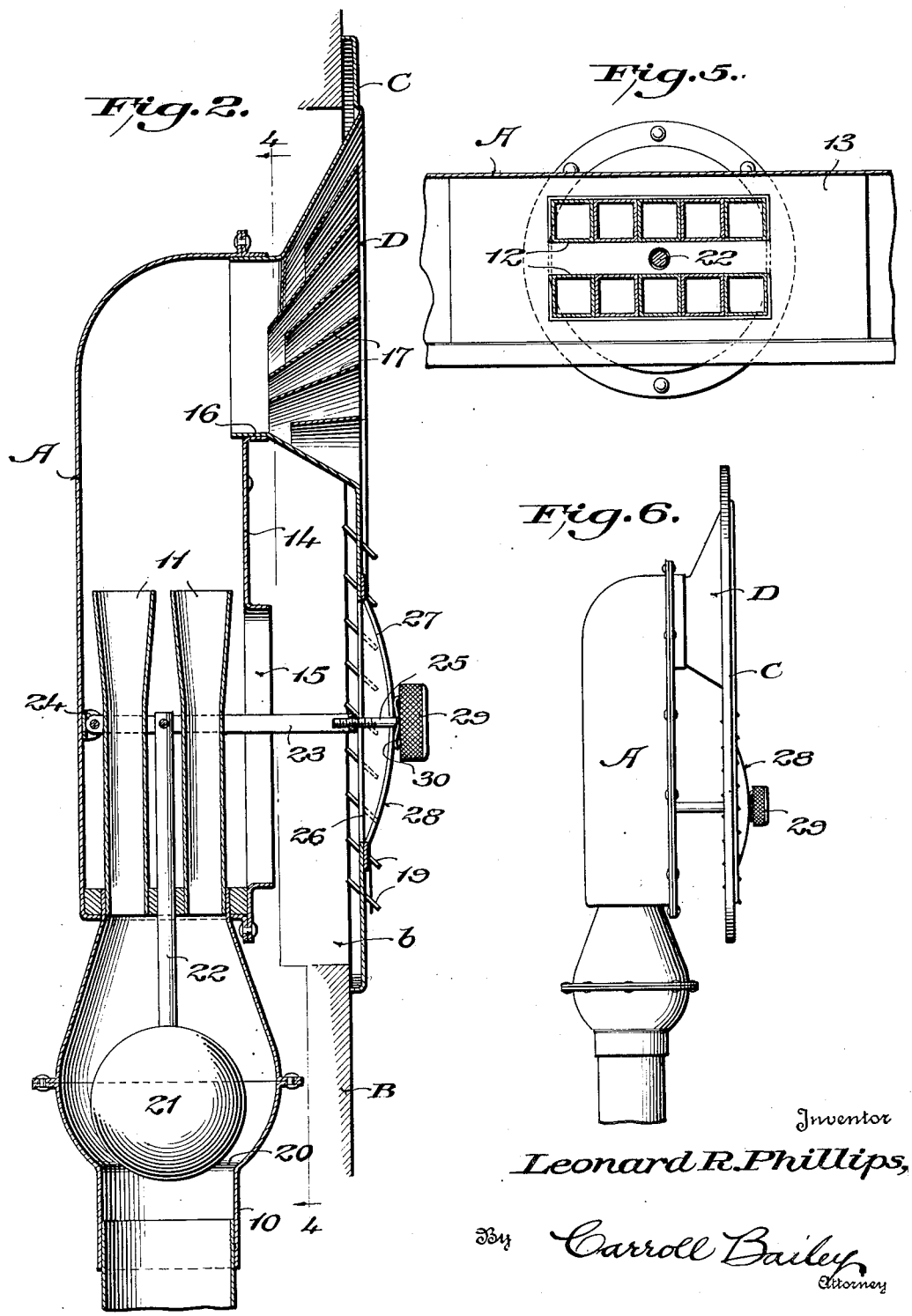

Feb. 13, 1951 L. R. PHILLIPS 2,541,280
AIR MIXING AND DELIVERY DEVICE
Filed June 27, 1947 3 Sheets-Sheet 3
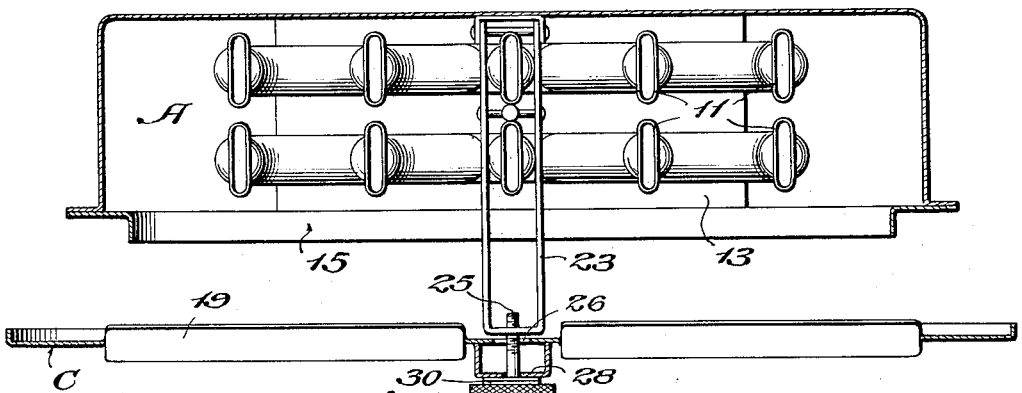
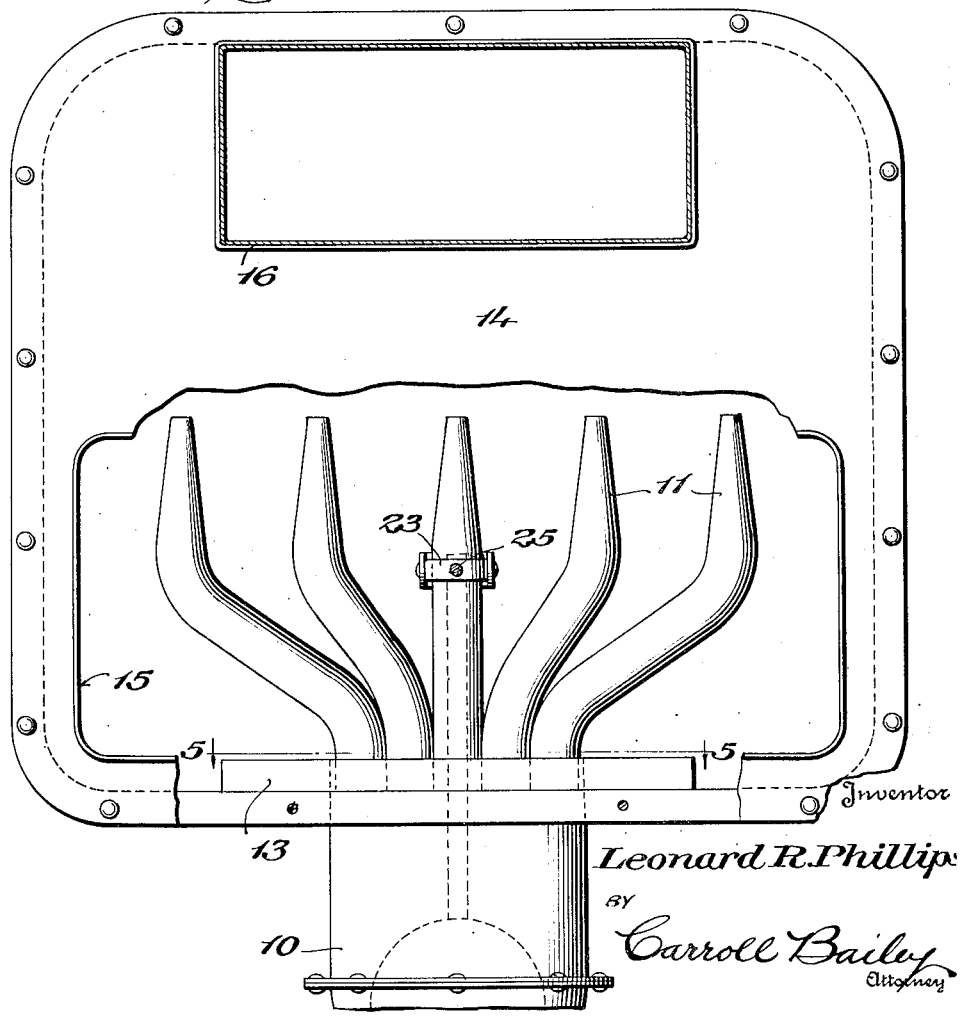
Inventor
Leonard R. Phillips
BY
Carroll Bailey
Attorney Patented Feb. 13, 1951

2,541,280

UNITED STATES PATENT OFFICE 2,541,280

AIR MIXING AND DELIVERY DEVICE

Leonard R. Phillips, Teaneck, N. J., assignor to Anemostat Corporation of America, New York, N. Y., a corporation of Delaware Application June 27, 1947, Serial No. 757,608

2 Claims. (Cl. 98—38)

This invention relates to air mixing and delivery devices, and has particular reference to improvements in air mixing and delivery devices for mixing hot or cold air with air of lower or higher temperature and for delivering the mixed air into rooms and other enclosures for heating, cooling or other purposes.

In certain instances air for heating purposes may be heated to an exceptionally high temperature at a central point and may be supplied under considerable pressure and velocity through comparatively small pipes or ducts to rooms and other enclosures to be heated. This may be highly advantageous for a number of reasons, but presents the problem of how best to avoid delivery of the air in undesirable strong, hot blast form into rooms and other enclosures. In other instances air for cooling purposes may be cooled to an exceptionally low temperature at a central point and may similarly be supplied advantageously under high pressure and velocity to rooms and other enclosures to be cooled but presents the like problem of how best to avoid its delivery in undesirable cold blast form.

Accordingly, the general object of the present invention is to provide an air mixing and delivery device which is specially suited to mix either high-temperature, or low-temperature, high-velocity air with air of lower or higher temperature and to deliver the mixed air into rooms or other enclosures without causing discomfort to occupants thereof.

More particularly, a special and important object of the invention is to provide a simple, practical air mixing and delivery device which is effective to intermix with the high-temperature air or the low-temperature air, as the case may be, other air either to reduce the temperature of the high-temperature air or to raise the temperature of the low-temperature air, and which further is effective to deliver the mixed air in diffused, low-velocity manner so that it does not cause discomfort to occupants of a room or other enclosure into which it is delivered.

With the foregoing and other objects in view, which will become more fully apparent as the nature of the invention is better understood, the same consists in an air mixing and delivery device embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Fig. 1 is a front elevation of an air mixing and delivery device constructed in accordance with the invention.

Figure 2 is a central, vertical, transverse section through the device.

Fig. 3 is a horizontal section on the line 3—3 of Fig. 1.

Fig. 4 is a vertical section on the line 4—4 of Fig. 2.

Fig. 5 is a horizontal section on the line 5—5 of Fig. 4; and

Fig. 6 is a side elevation of the device in a reduced scale.

Referring to the drawings in detail, it will be observed that the present air mixing and delivery device comprises primarily an air mixing chamber A to be mounted in or behind a side wall B of a room or other enclosure, and a wall plate C to be mounted in covering relationship to an opening b in said side wall.

The mixing chamber A may be formed in any suitable manner from sheet metal or other suitable material and is of generally rectangular shape as viewed in front elevation. It is relatively narrow from front to rear so as to adapt it readily to be mounted in a room or other enclosure side wall.

A supply pipe or duct 10 for either high-temperature or low-temperature, high-velocity air is located below the mixing chamber A and its upper end is suitably connected with the lower ends of a plurality of nozzles 11 which extend upwardly from the bottom of said mixing chamber suitable distances into the latter. There may be any suitable number of the nozzles 11 arranged as desired. In this connection and as shown, there may be two rows of the nozzles 11 spaced apart forwardly and rearwardly of the mixing chamber A and the upper ends of the nozzles of each row may be spaced apart laterally with respect to said mixing chamber so that high velocity, high or low temperature air supplied by the pipe or duct 10 through said nozzles to said mixing chamber is distributed substantially uniformly throughout the horizontal area of said mixing chamber.

From a practical structural standpoint, the lower ends of the nozzles 11 of each row may be of rectangular shape and may be nested in a related elongated opening 12 in a block 13 disposed in the bottom of the mixing chamber A, while the upper end of the supply pipe or duct 10 may be of rectangular shape and may be suitably fitted into said openings 12 so as to supply air to all of said nozzles. Alternatively, mounting of said nozzles in the mixing chamber A and connection of the same with the pipe or duct 10 may be effected in any other suitable manner.

In the lower part of the front wall 14 of the mixing chamber A is an opening 15 of suitable height and of nearly the full width of said chamber for the admission to said chamber of air at a temperature to moderate the air supplied to said chamber through the nozzles 11, while in the upper part of the said front wall of said chamber is an opening 16 of suitable size and shape with which is connected the rear end of an air delivery device designated generally as D.

The air delivery device D preferably is of a type to effect diffusion and to reduce the velocity of air delivered therethrough, and to that end may comprise, as shown, a plurality of open-ended, spaced-apart, hollow, flaring members 17 to divide the delivered air into a plurality of flaring streams.

The air delivery device D may be separate from the wall plate C or it may appropriately be formed as a part of said wall plate as shown.

Any suitable provision may be made for supply of air from any suitable source through the opening 15 to the mixing chamber A for intermixture with air delivered to said chamber through the nozzles 11. In this connection and as illustrated in the drawings, the wall plate C may be provided, below the air delivery device D and in front of said opening 15, with openings 18 for the supply to said mixing chamber through said opening 15 of air from the room or other enclosure into which air is delivered through the device D. The openings 18 may be defined by louvers 19 and said louvers may be fixed or adjustable as desired.

Any suitable valve means may be provided to regulate supply of air from the pipe or duct 10 to the mixing chamber A. In this connection and as illustrated in the drawings, the pipe or duct 10 is provided with a suitable valve seat 20 with which cooperates a suitable vertically movable valve 21. A stem 22 extends from said valve upwardly into the mixing chamber A and at its upper end is connected to a medial portion of an actuating arm 23 which is pivoted at its rear end to a bracket 24 fixed to the rear wall of said mixing chamber. A screw 25 is threaded in the front end of said arm 23 and extends through a vertical slot 26 in the wall plate C and through another vertical slot 27 in an arcuate wall 28 suitably fixed to the front of said wall plate C. The wall 28 is concentric with respect to the pivot of the arm 23 and between the same and a knob or handle 29 on the outer end of said screw 25 is interposed a spring washer 30. Thus, by loosening the screw 25 it may be employed to swing the arm 23 to open or close the valve 21 any desired amount, while by tightening said screw the washer 30 may be compressed against the wall 28 to frictionally maintain any desired adjustment of said valve.

Assuming opening of the valve 21 and supply of either high-temperature or low-temperature, high-velocity air through the pipe or duct 10 and the nozzles 11 to the mixing chamber A, the operation of the device will be apparent. The jets of high-velocity air issuing from the nozzles 11 will tend to produce a sub-atmospheric pressure in the lower part of the mixing chamber A with the result that air will flow into said chamber through the opening 15 and will become intermixed with and will moderate the temperature of the air supplied by said nozzles. Because of the plurality of nozzles 11 having their upper or outlet ends spaced apart as shown and described, the mixing will be quite thorough. The mixed air then will be delivered through the delivery device D and by the latter will be diffused and have its velocity lowered so that it will not cause discomfort to occupants of the room or other enclosure into which it is delivered.

From the foregoing description considered in connection with the accompanying drawings it is believed that the construction and operation of the device will be clearly understood and its advantages appreciated. It is desired to point out, however, that while only a single specific structural embodiment of the invention has been illustrated and described, the same is readily capable of specifically different structural embodiments within its spirit and scope as defined in the appended claims.

I claim:

1. An air mixing and delivery device comprising an air mixing chamber, an air supply duct below said chamber, a plurality of nozzles extending from said duct upwardly into said chamber for delivery of air into the latter in plural jet form, said mixing chamber having a front opening in the lower part thereof for admission thereto of air to be intermixed with and to modify the temperature of the air delivered thereto by said nozzles, a wall plate separate from said mixing chamber disposed in front of the latter and having in the lower part thereof an opening for flow of air therethrough to said mixing chamber through the front opening in the latter, said mixing chamber having a second front opening above said first mentioned front opening and above said nozzles for outlet of mixed air from said chamber, an air diffusing air outlet device carried by said wall plate and detachably connected with said second front opening in said mixing chamber, a valve for controlling supply of air from said duct to said nozzles, a lever pivoted at its rear end to said mixing chamber for vertical swinging movement and having a handle exposed at the front of said wall plate for vertically swinging the same, and a connection between said lever and said valve whereby the former is effective by vertical swinging movement thereof to open and close the latter.

2. An air mixing and delivery device comprising an air mixing chamber, an air supply duct below said chamber, a plurality of nozzles extending from said duct upwardly into said chamber for delivery of air into the latter in plural jet form, said mixing chamber having a front wall provided with an upper opening for outlet of air from said chamber and with a lower opening for admission to said chamber of air to be intermixed with and to modify the temperature of the air delivered to said chamber by said nozzles, a wall plate separate from said chamber disposed in front of the latter and having in the lower part thereof an opening for flow of air to said chamber through the lower opening in the front wall of the latter, and an air diffusing air outlet device carried by said wall plate and having a neck portion detachably connected with the upper opening in the front wall of said chamber.

LEONARD R. PHILLIPS.

REFERENCES CITED

The following references are of record in the file of this patent:

UNITED STATES PATENTS

| Number | Name | Date |
| --- | --- | --- |
| 1,878,012 | Stacey, Jr., et al. | Sept. 20, 1932 |
| 2,000,597 | Keyes | May 7, 1935 |
| 2,012,179 | Ashley | Aug. 20, 1935 |
| 2,122,168 | Woolley | June 28, 1938 |
| 2,159,276 | Lawless | May 23, 1939 |
| 2,314,569 | Baker | Mar. 23, 1943 |
| 2,345,537 | Keep | Mar. 28, 1944 |
| 2,442,963 | Sewell et al. | June 8, 1948 |

FOREIGN PATENTS

| Number | Country | Date |
| --- | --- | --- |
| 379,430 | Great Britain | Sept. 1, 1932 |
| 530,178 | Great Britain | Dec. 6, 1940 |
| 599,956 | Great Britain | Mar. 24, 1948 |